(No Model.)

C. A. HARKNESS.
ELEVATOR.

No. 569,129.

Patented Oct. 6, 1896.

Fig. 4.

WITNESSES.
Matthew M. Blunt
Marcus B. May

Fig. 3.

INVENTOR.
Charles A. Harkness
By Arthur W. Crosby
ATT'Y.

(No Model.)   C. A. HARKNESS.   12 Sheets—Sheet 3.
ELEVATOR.

No. 569,129.   Patented Oct. 6, 1896.

WITNESSES.   INVENTOR.

(No Model.)　　　　　　C. A. HARKNESS.　　　12 Sheets—Sheet 4.
ELEVATOR.

No. 569,129.　　　　　　　　　　　Patented Oct. 6, 1896.

Fig. 8　　　　　　　　　　　Fig. 7.

WITNESSES　　　　　　　　　INVENTOR.

(No Model.) 12 Sheets—Sheet 5.
C. A. HARKNESS.
ELEVATOR.
No. 569,129. Patented Oct. 6, 1896.

WITNESSES.
Matthew M. Blunt
Marcus B. May

INVENTOR.
Charles A. Harkness
By Arthur W. Crosley, ATT'Y (No Model.) 12 Sheets—Sheet 6.

C. A. HARKNESS.
ELEVATOR.

No. 569,129. Patented Oct. 6, 1896.

WITNESSES.
Matthew M. Blunt
C. C. Stecher

INVENTOR.
C. A. Harkness
by
M. B. May
his ATT'Y.

(No Model.) 12 Sheets—Sheet 7.
C. A. HARKNESS.
ELEVATOR.

No. 569,129. Patented Oct. 6, 1896.

WITNESSES. INVENTOR.
Matthew M. Blunt. Charles A. Harkness
Marcus B. May By Arthur G. Crosley
ATT'Y.

(No Model.)

C. A. HARKNESS.
ELEVATOR.

Patented Oct. 6, 1896.

WITNESSES
Matthew M. Blunt.
Marcus B. May.

INVENTOR.
Charles A. Harkness
By Arthur W. Crosley,
ATT'Y.

(No Model.) 12 Sheets—Sheet 9.

C. A. HARKNESS.
ELEVATOR.

No. 569,129. Patented Oct. 6, 1896.

WITNESSES.
Matthew M. Blunt
Marcus B. May

INVENTOR.
Charles A. Harkness
By
ATT'Y.

(No Model.) 12 Sheets—Sheet 10.

C. A. HARKNESS.
ELEVATOR.

No. 569,129. Patented Oct. 6, 1896.

WITNESSES.
Matthew M. Blunt.
Marcus B. May.

INVENTOR
Charles A. Harkness
By Arthur W. Crossley
ATT'Y.

(No Model.)        C. A. HARKNESS.        12 Sheets—Sheet 11.
ELEVATOR.

No. 569,129.        Patented Oct. 6, 1896.

WITNESSES.        INVENTOR.
Matthew M. Blunt.        Charles A. Harkness
Marcus B. May        By
       ATT'Y (No Model.) 12 Sheets—Sheet 12.

C. A. HARKNESS.
ELEVATOR.

No. 569,129. Patented Oct. 6, 1896.

WITNESSES.
Matthew M. Blunt.
Marcus B. May.

INVENTOR.
Charles A. Harkness
By Arthur W. Crossley
ATT'Y

UNITED STATES PATENT OFFICE.

CHARLES A. HARKNESS, OF PROVIDENCE, RHODE ISLAND.

ELEVATOR.

SPECIFICATION forming part of Letters Patent No. 569,129, dated October 6, 1896.

Application filed October 17, 1895. Serial No. 565,955. (No model.)

*To all whom it may concern:*

Be it known that I, CHARLES A. HARKNESS, of Providence, in the county of Providence and State of Rhode Island, have invented certain new and useful Improvements in Elevators, of which the following is a specification.

This invention has relation to elevators generally, and particularly to what are commonly called "passenger-elevators;" and it has for its objects, first, the provision of an improved method of equipping the elevator-car with a controlling rope or line with a view to keeping the line taut at all times and preventing shock to the same and to the car through sudden stopping or starting; second, the provision of improved means for securing the stoppage automatically of the car with certainty at the landings along the line of the elevator-shaft; third, of providing improved means for preventing the starting of the car after the same has been stopped and the corridor-door opened to any extent until the door is first fully closed; fourth, the provision of means for preventing what is commonly termed "creeping," that is, a slight movement of the car after it has been stopped; fifth, the provision of improved means for automatically shutting and for locking the doors, whereby the use of catches or projections, which are liable to tear or injure the clothing or person of a passenger, is obviated; sixth, the provision of an automatic secondary lock for the doors for absolutely locking the door against movement except when the car is at the landing.

To these ends the invention consists in the improvements which I will now proceed to describe in detail, and then point out with particularity in the appended claims.

Reference is to be had to the annexed drawings, and to the letters marked thereon, forming a part of this specification, the same letters designating the same parts and features, as the case may be, wherever they occur.

Of the drawings, Fig. 18 illustrates the locking and stopping devices as directly engaging the valve-controlling line itself.

In the drawings, *a* designates an elevator-car provided with a line-shifting device, consisting, in this embodiment of my invention, of a pulley or sheave *b*, journaled on a shaft *c*, supported in suitable bearings in its wall or side and having a hand-operative device in the form of a crank or handle *d*, fixed on the inner end of the said shaft.

*e* designates the controlling rope or line which passes around the pulley *b*, down around pulleys *f f*, with which the lines *g g* are connected, thence up over pulleys *h h* and *i i* above the car, the ends being connected, as shown, with the wall of the well by bolts $m$. A tension device, consisting in this instance of a weight $k$, and a bar $j$, from which it depends, is arranged on the line, so as to take up the slack, there being pulleys $o$ $o$ under which the line passes. The weight $k$ travels in guides $l$ on the wall of the well or hatchway, the guides being disposed out of the path of the car, since the weight travels in a direction opposite to that of the travel of the said car. The guides extend from the top of the well or hatchway to a point half-way of the travel of the car.

Figure 1:
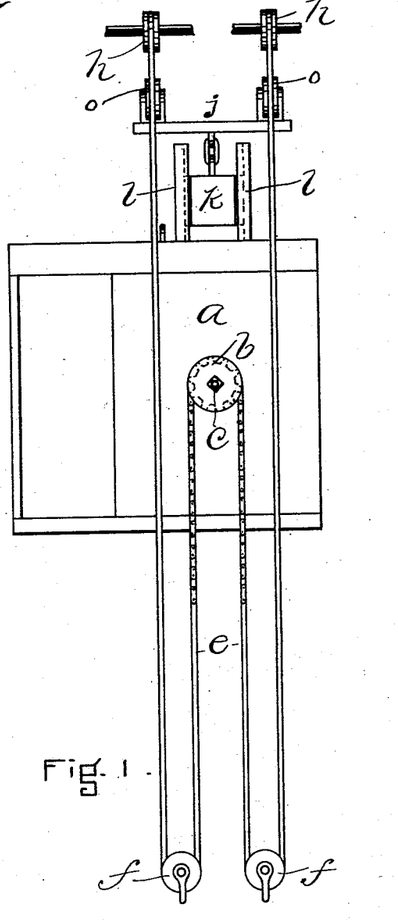
Figure 1 is a front elevation of an elevator-car equipped with a controlling rope or line constructed and arranged in accordance with my improvements.
Figure 2:
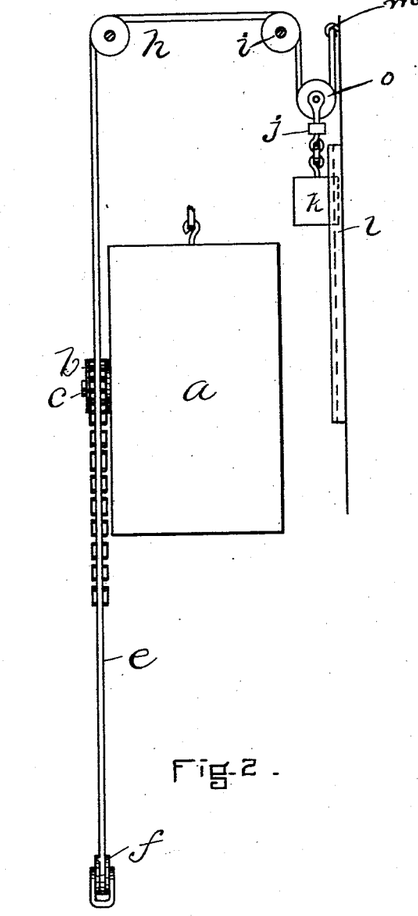
Fig. 2 is a side elevation of what is illustrated in Fig. 1.
Figure 3:
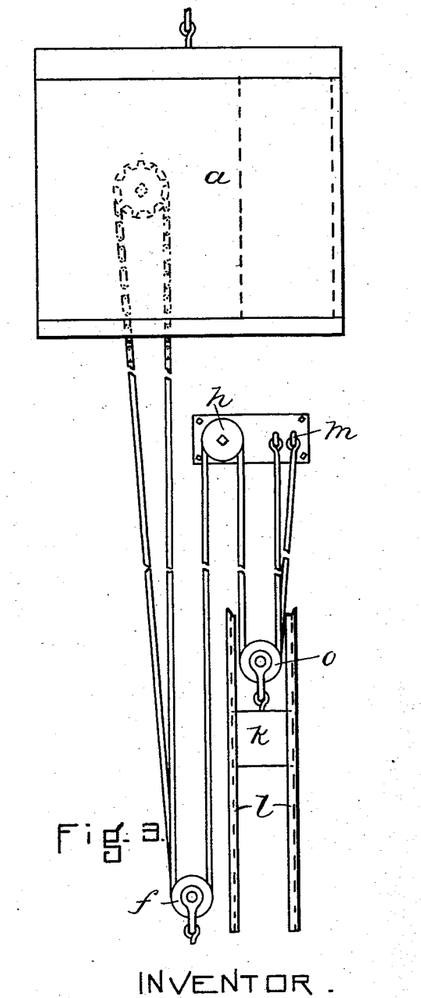
Figs. 3 to 8, inclusive, illustrate modifications with respect to the manner of roping and applying the tension-carriage and the valve-actuating devices to the rope or line.
Figure 4:
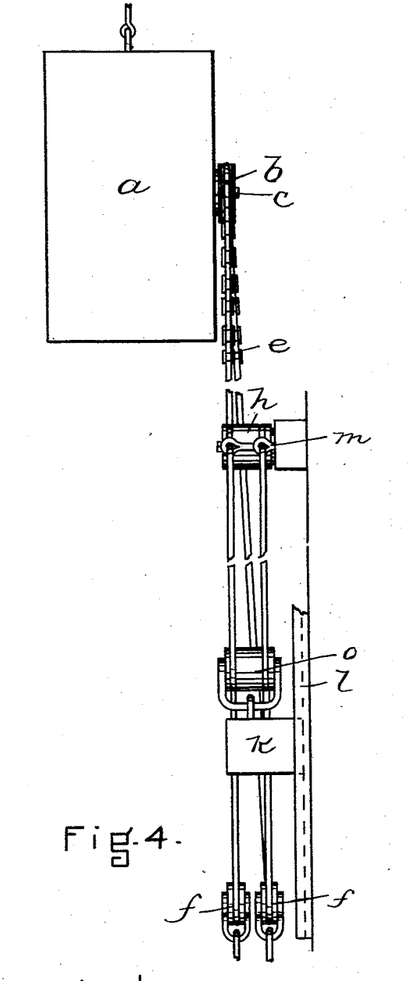

In Figs. 3 and 4 I have shown how the weight $k$ may travel in guides $l$ $l$, extending downward from the center of the well or hatchway, the other parts being the same as those illustrated in Figs. 1 and 2. By passing the operating-line directly from the pulleys $f$ over pulleys $h$, which are located at the top of the guides near the center of the well or hatchway, I am enabled to use a much shorter line, as will be readily seen.

Figure 5:
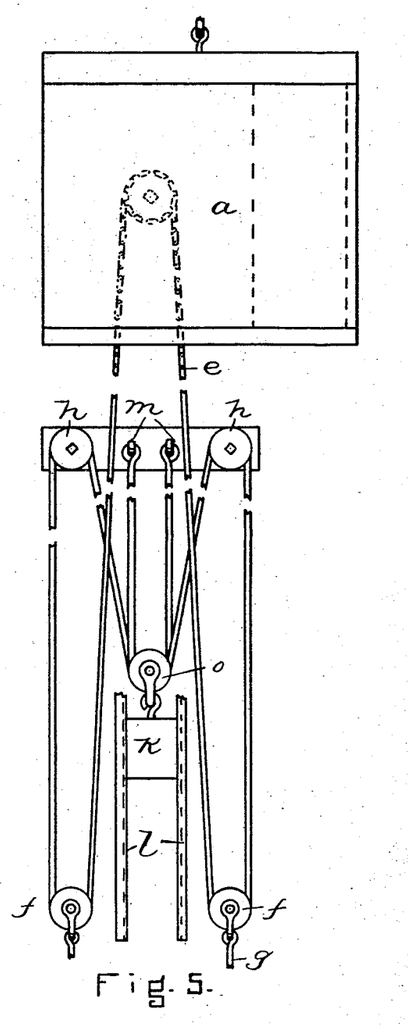
Figure 6:
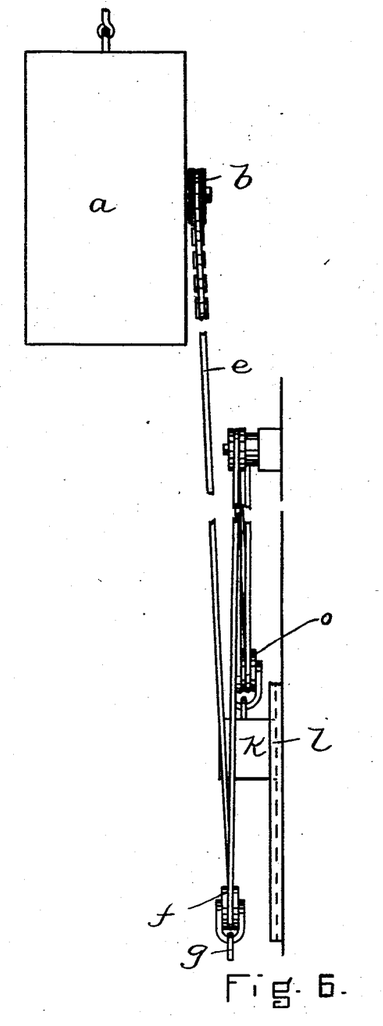

Instead of arranging the pulleys $f$ $f$ and $h$ $h$, respectively, side by side, as shown in Fig. 3, they may be placed as illustrated in Figs. 5 and 6—that is to say, the pulleys $h$ are disposed one on each side of the bolts $m$, to which the ends of the operating-lines are secured, the pulleys $f$ $f$ being correspondingly arranged on either side of the guides $l$ $l$.

Figure 7:
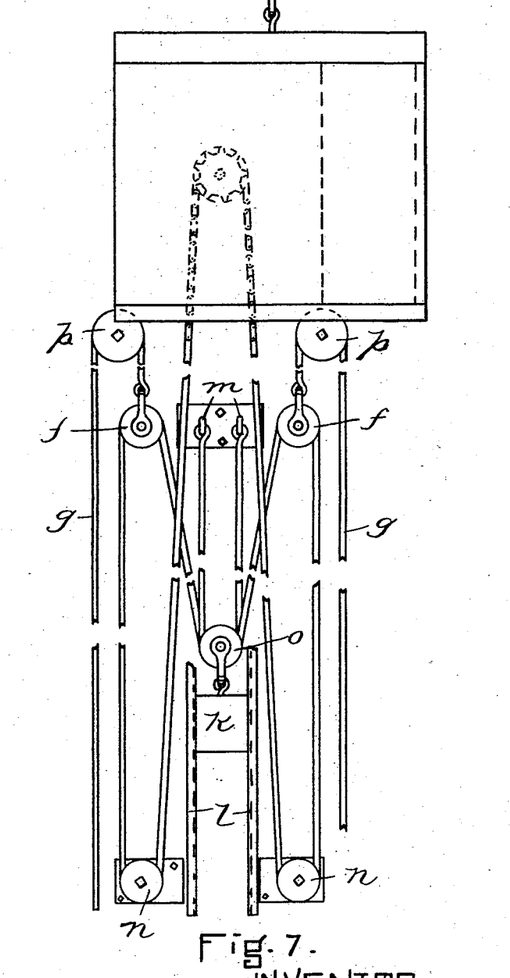
Figure 8:
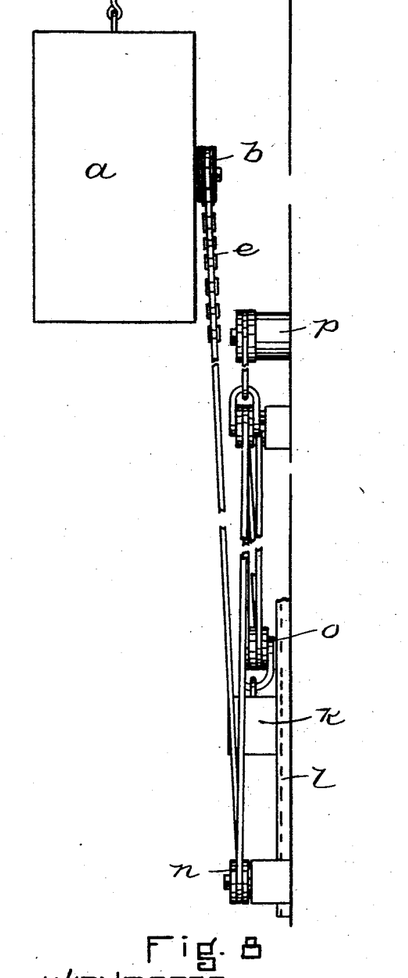

It frequently happens in placing an elevator apparatus in a building that it is desirable to locate the pulleys $f$ $f$, which are connected with the valve-operating devices, at points above the central part of the elevator well or hatchway. Hence I have shown in Figs. 7 and 8, inclusive, how the operating-line may pass from the wheel $b$ on the car, down under sheaves $n$ at the bottom of the well, up over the pulleys $f$, down under the pulleys $o$, which are attached to the weight, and finally have its ends secured to bolts on the wall of the hatchway. In this case, however, the pulleys $f$ $f$ are secured upon the ends of long cables, chains, or ropes $g$, which are passed over pulleys or sheaves $p$, secured at or near the center of the well or hatchway.

As is well known to those skilled in the art, the controlling-lines used in elevator structures to control the movements of the car are liable to variation as to their length by constant use and by changes in the atmosphere, and, furthermore, such ropes or lines are quite liable to become broken up and abraded by reason of their passage around their pulleys, which are usually small. This becomes at once an element of danger and renders their operation more or less uncertain. To avoid this, I may construct the said line so as that it shall have the characteristics of a chain, as is shown in Figs. 1 and 2. When the said line is constructed as a chain, while it may lengthen to some extent, the tension-carriage with which the line is supported will take up all slack, and as there is no appreciable shrinkage in the line it does not become so tightened as to cause it to bind and be hard or difficult of operation.

In all of the devices which I have illustrated it will be observed that the ends of the controlling-line are positively secured to the wall of the well or hatchway, and that the tension devices travel in guides out of the path of the car. This is of essence in my invention, since I am enabled thereby to keep the controlling-line taut at all times and coincidently therewith employ shorter lines than when the line has its ends secured directly to the weight.

In connection with the devices already described I provide means for automatically shifting the controlling-line and stopping the car at a landing or other predetermined point, and also means coacting with the door of the corridor or the car for automatically locking the line to the wall of the well and preventing the car from moving or creeping while the door is partially or entirely open.

The stopping means consists of a device mounted on the wall of the well and constructed to engage the line, or mechanism connected therewith, and hold it so that the continued movement of the car will effect a shifting of the pulleys which are connected with the valve for the motor.

The controlling-line belongs to the class known as "running-lines," that is, lines which are connected with the car and travel therewith, (in contradistinction to "standing-lines" or those relatively to which the car travels.) Hence in order to positively lock the running controlling-line against movement it is necessary to lock it to some stationary support on the wall of the well or hatchway.

Referring more particularly to Figs. 9 to 14, inclusive, the controlling-line $e$ is engaged with the sprocket-wheel $b$, which is connected with the hand-operative device $d$, passing by two idlers $a'$ $a'$ on the car over a pulley $b'$, and thence downward to the motor-actuating devices.

Secured to the line at a point substantially midway between the top and bottom of the car is a rack-plate $c'$, sliding in guides $e'$ on the car. (See Figs. 11 and 12.) The plate is provided with integral teeth, as shown, and has on its rear face a wide longitudinal groove $b^6$ and on its front face a transverse groove $a^6$. In the last-mentioned groove there is a sliding tooth $f'$, which has tongues $g'$ $g'$ to hold it in the said plate. The said tooth is slotted vertically to receive the edge of a movable T-shaped bar $h'$, which extends into and has a limited lateral movement in the vertical slot $b^6$ in the plate $c'$. Thus it will be seen that the plate and the tooth can slide freely vertically relatively to the bar $h'$, while at the same time the lateral movement of the bar in the slot $b^6$ will cause a similar movement of the tooth in the plate $c'$. The bar $h'$ is supported at its ends by links $i'$ $i'$ and is connected by a screw with the end of a rod $j'$, which is secured to the end of a crank $k'$, fastened on the axis of of the handle $l'$.

Figures 9, 10, 11, 12, 13:
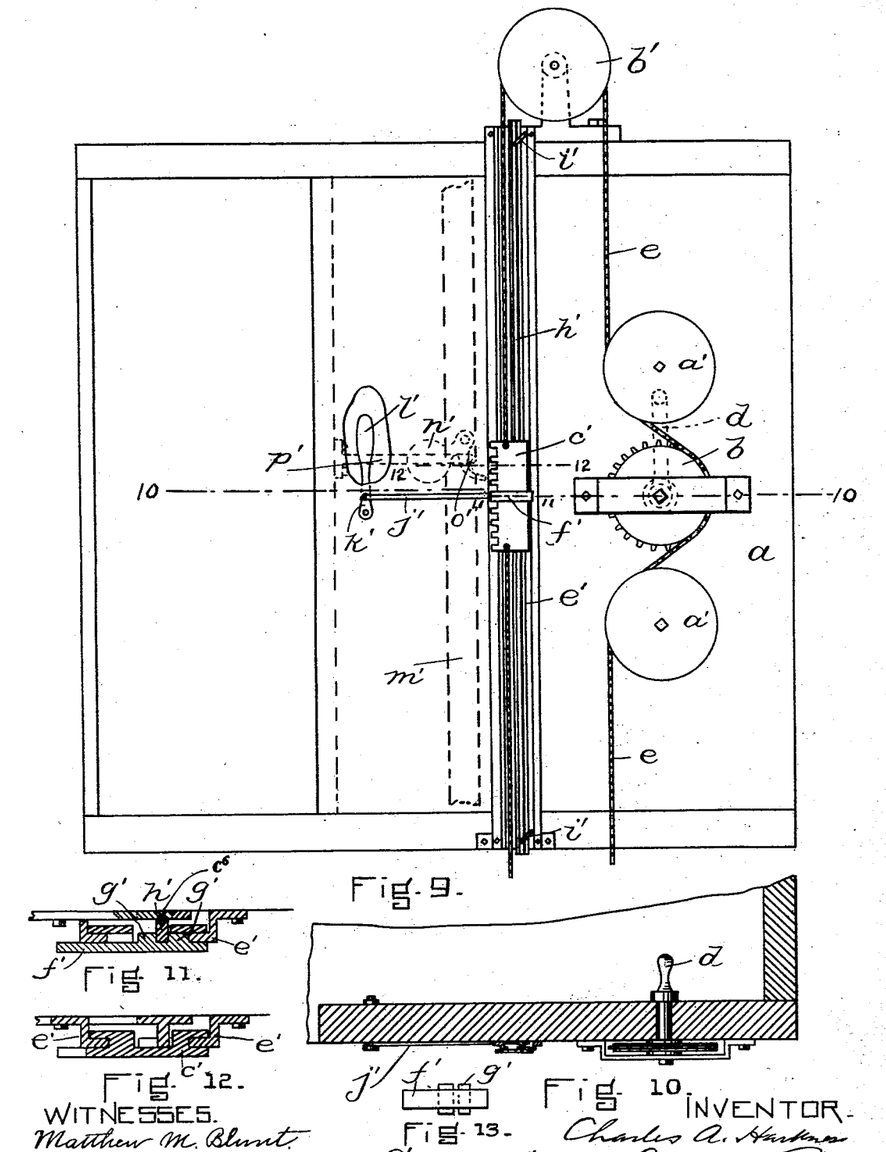
Fig. 9 is a side elevation of a car provided with means for automatically stopping the car at a predetermined point and locking it at said point by means coacting with the corridor-door.
Figs. 10 to 14, inclusive, illustrate details of construction of the various parts shown in Fig. 9, the sections in Figs. 10 and 12 being on the lines 10 10 and 12 12, respectively, of Fig. 9, and the section in Fig. 11 being also on line 10 10, Fig. 9, but somewhat enlarged.
Figure 10:
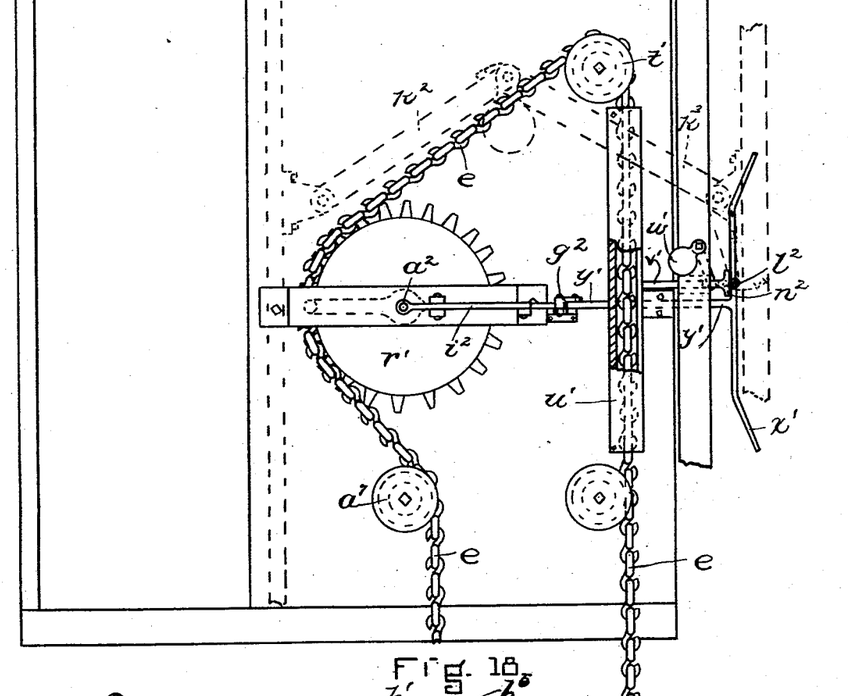
Figure 10A:
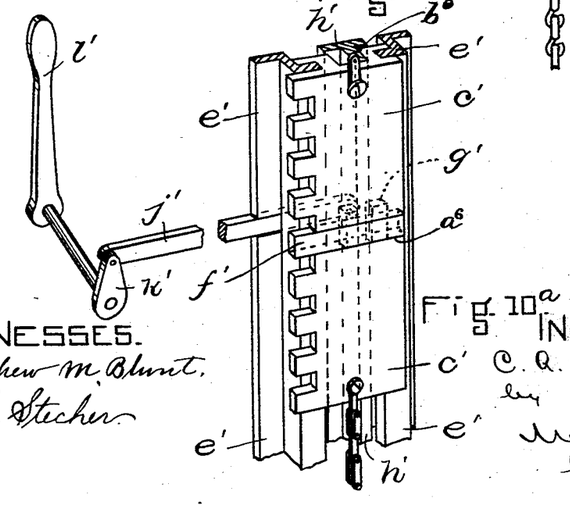
Figure 14:
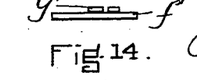

On a strip $m'$, secured along the elevator-well, I mount a swinging weighted latch or dog $n'$, which has an outwardly-projecting end which is so arranged that when the parts are in the positions shown in Fig. 9 the plate $c'$ and the tooth $f'$ will move freely past it; but when the attendant is desirous of stopping the car he throws the lever $l'$ to one side and draws the tooth out until its end will strike upon the end of the latch $n'$. This locks the plate $c'$, and with it the operating-line, to the walls of the well, so that the continued movement of the car will shift the valve-operating pulleys and stop the motor. Then, when the car has come to a state of rest, the lever $l'$ and the bar $h'$ are allowed to return to their original positions and the tooth $f'$ will be withdrawn. Then I bring into play the door-controlled devices for locking the line positively to the wall when the door is moved to open position.

$o'$ is a pin or projection connected with the door and bearing against the latch or dog $n'$, so as to hold it out of the path of the plate $c'$, for the weight tends to throw the end of the dog forward. In this case the pin or projection $o'$ is on a rod $p'$, connected with the door, so that at the moment the latter begins to slide toward open position the pin will be moved away from the dog and the end of the latter will immediately slip in between the teeth of the rack-plate $c'$ and lock the line to the wall of the well or hatchway until the door is fully closed.

In many elevators there is a tendency of the car to creep even after it has been stopped, owing to leakage at the motor or other causes, and hence by locking the line to the wall of the well a movement of the car in either direction will tend to start the motor in the opposite direction and bring the car to a perfect standstill. There are many other ways in which this result, as set forth above, may be accomplished. For instance, I have illustrated in Figs. 15, 16, and 17 a modified mechanism by means of which the car may be stopped in its movement at a predetermined point and have the controlling-line locked to the wall of the well. In this case the operating-wheel $b$ for the controlling-line is mounted on the inside of the car, it being supported upon a tubular shaft $q'$, upon the outer projecting end of which is mounted a sprocket-wheel $r'$.

Figure 15:
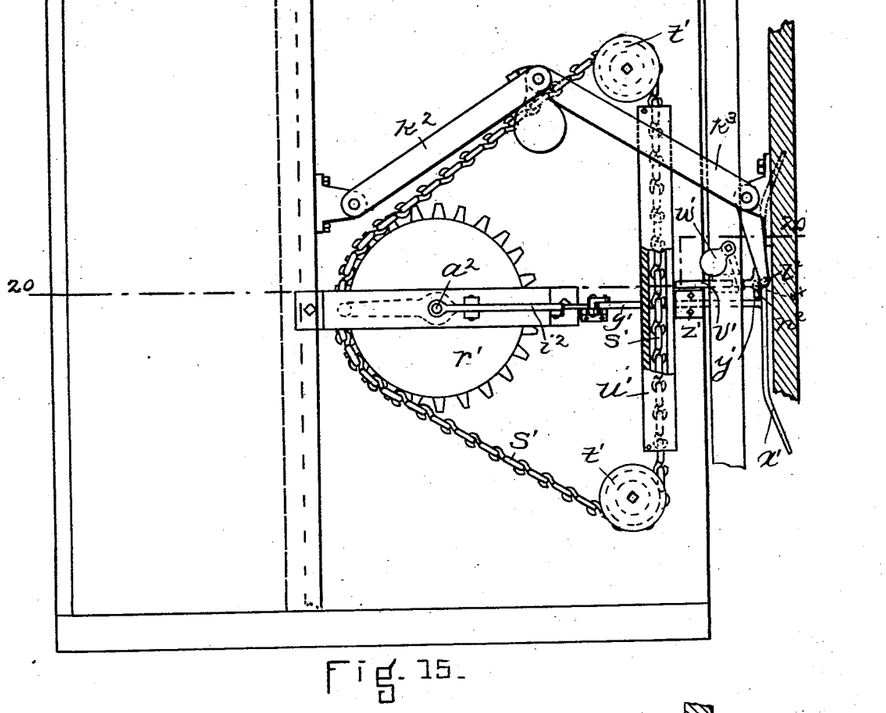
Figs. 15, 16, and 17 illustrate a slightly-modified construction, by means of which the car may be automatically stopped at a landing and the operating-line locked against movement by means coacting with the door.
Figures 16, 17:
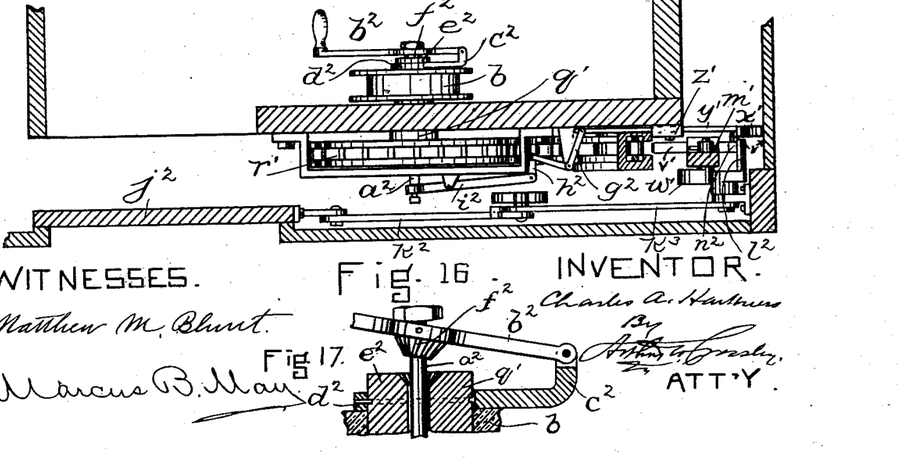

$s'$ is a sprocket-chain with centrally-open links which passes around the wheel $r'$ and around two idlers $t'$ $t'$, so as to have a vertical portion arranged in a vertical line near the edge of the car, the chain forming, as it were, a triangle with one of its sides vertical. The vertical part of the chain passes through a guide $u'$, which is open at its side, as clearly shown in the last-mentioned figures. The wheels $b$ and $r'$ being rigidly mounted upon the same supporting-shaft, it follows that when the chain $s'$ is shifted so as to turn the wheel $r'$ the wheel $b$ and the valve-controlling line will be both correspondingly shifted.

$m'$ is a strip which extends along the elevator well or hatchway, and upon this strip I mount a dog or latch $v'$ which, though normally out of the path of the guideway $u'$ and the chain $s'$, may be also thrown into engagement with the chain, so that the continued movement of the car will cause the chain $s'$ to move relatively thereto and rotate the wheel $r'$ so as to shift the valve-controlling line and bring the motor to a state of rest. The latch-bar $v'$, which is provided with a laterally-projecting pin $v^\times$, is normally held in its outer position by means of weight $w'$. In order that the latch-bar may be thrown in so as to engage with the chain $s'$, I mount a sliding bow or cross-head $x'$ upon the car, it having outwardly-inclined end portions and a central straight portion, as clearly shown in Fig. 15. It is secured to the rod $y'$, which is adapted to slide in a bracket $z'$ on the car.

$a^2$ is a rod which projects through the tubular supporting-shaft $q'$ and has its inner end secured to a handle $b^2$. This handle $b^2$ is hinged to a bracket $c^2$ on a loose sleeve $d^2$, which is adapted to turn freely on the tubular shaft. Between the tubular shaft and the handle I place means for disengaging them, consisting of a clutch, so that the wheel $b$ may at times rotate freely relatively to the handle. The end $e^2$ of the tubular shaft is provided with internal conical bearing-surfaces, with which the friction cone $f^2$ on the handle may engage when pressed inward, or the shaft-end may have internal teeth or corrugations to receive teeth or corrugations on the cone.

When it is desired by the attendant to turn the wheel $b$, he presses the handle $b^2$ inward, so that the friction-cone $f^2$ will engage the end of the shaft, and then by turning the handle while it is still firmly held inward the wheel $b$ will be rotated.

$g^2$ is a bell-lever connected with the rod $y'$ and with a link $h^2$ pivoted to a lever $i^2$, connected at its end with the sliding rod $a^2$. By means of these rods and levers, when the handle $b^2$ is drawn by the attendant away from the wall of the car the bow $x'$ will be drawn inward, as will be clearly understood. In stopping the car automatically at a landing it is necessary to draw the bow $x'$ inward, and as the car travels downward or upward the bow will engage the pin $v^\times$ on the latch $v'$ and thrust the latter into engagement with one of the links of the chain $s'$. The continued movement of the car will shift the chain and the operating-line, as I have before described.

Of course it will be understood that, if desired, the car may be brought to a state of rest opposite a landing by turning the handle $b^2$ in the direction opposite to which it was turned to start the car.

There are several important results to be attained from the use of this form of mechanism, as, for instance, the handle is disengaged from the wheel $b$, a friction device or clutch being between them, so that when the bow has been drawn inward toward the car to effect a stopping at the next landing the handle has been drawn away so as to disengage it from the tubular shaft and the wheel $b$, allowing the latter to revolve freely while the handle remains stationary.

Although the devices just described are employed for stopping the car, yet they may be used to prevent creeping of the same when the door of the corridor is closed. It happens sometimes, unless a device of this kind be used, that after the attendant leaves a car with the door shut the car will creep in either direction, and hence by throwing the latch by means of the handle into engagement with the line and leaving it there the attendant may safely leave the car without danger of the latter creeping in either direction.

The latch or dog $v'$ may be employed in connection with movable door-actuated devices for locking the line to the wall of the well to prevent creeping. The corridor-door $j^2$ is indicated as being connected with the side wall of the elevator-well by toggle-levers $k^2 k^3$, the latter, $k^3$, being provided with a crank-pin $l^2$. When the door is moved toward open position, the crank-pin will impinge against the cross-head $n^2$ on the latch $v'$ and push the latter in, so as to engage with one of the links of the chain $s'$, thus locking the operating-line, through the medium of the chain $s'$ on the sprocket-wheel $r'$, to the wall of the elevator-well.

The latch $v'$ in Fig. 18 and the latch $v'$ and the chain $s'$ in Fig. 15 constitute what I may term a "secondary" mechanism for stopping the car. That is to say, the mechanism is secondary to the line-shifting wheel, and the handle $b^2$ may be connected with either the line-shifting wheel or pulley and the secondary mechanism by means of the clutch before described.

In Fig. 18 I have illustrated how the latch may be operated to engage the links of the controlling-line instead of engaging those of a supplemental line. The controlling-line passes around the sprocket-wheel $r'$ outside of the car, up over idler $t'$, through the guide $u'$, and from thence to the motor-actuating pulleys. (Not shown in this figure.) An additional idler $a^7$ is employed to insure that the chain will be properly guided to the sprocket-wheel. The mechanism for engaging the latch with the chain is similar to that just described.

Figure 19:
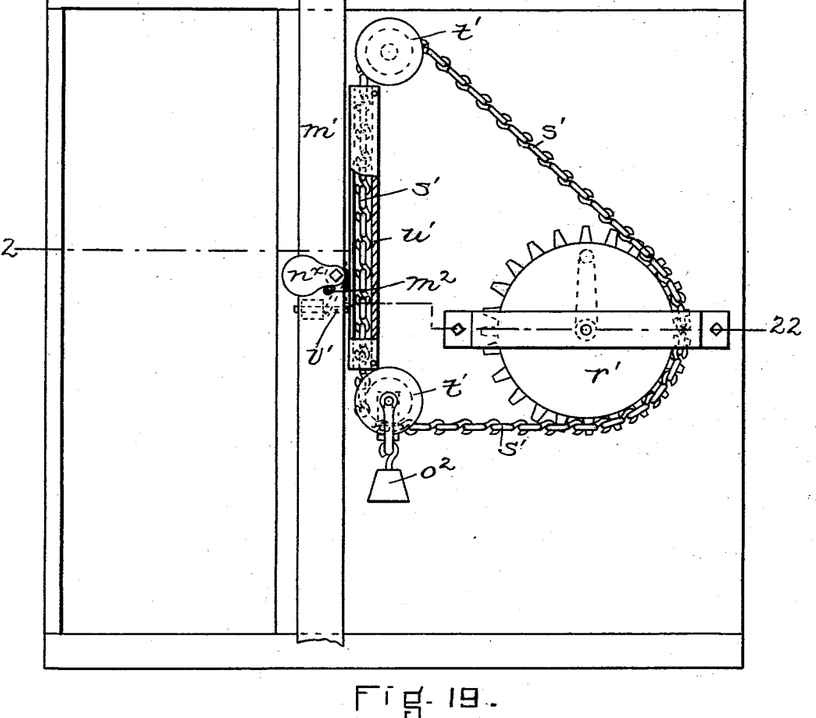
Figs. 19 and 20 show a still further modified form for accomplishing the locking of the car against movement while the door is open, it being similar in a number of respects to the construction shown in Fig. 15.
Figure 20:
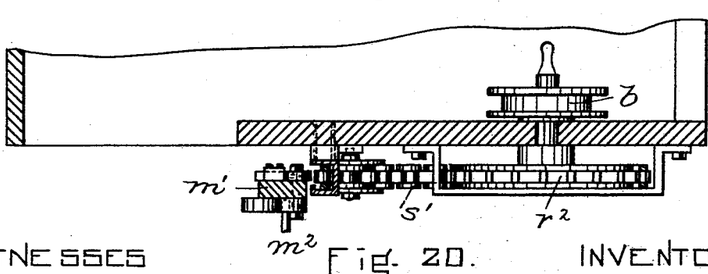

In Figs. 19 and 20 I show substantially the same construction, except that the means for stopping the car in its movement is omitted. In this construction the latch $v'$ is mounted upon the strip $m'$ and is held out of the path of the guide $u'$.

$n'$ is a weighted lever pivoted on strip $m'$, which tends to throw the latch $v'$ forward, the weight being held up by a pin $m^2$ on the door, (the latter not being shown.) This pin is so arranged on the door relatively to the weight that when the door is closed the weight will be held in the position shown in Fig. 19, but as soon as the door is partially open the pin will be moved from under the weight and the latter will cause the lever $n^\times$ to force the dog or latch $v'$ into one of the centrally-open links of the chain $s'$. I prefer to mount one of the idler-wheels $t'$ so that its supporting-axle may slide in a guide on the car, and I attach the weight $o^2$ to the axle, so that the wheel will act as a tightener for the chain to keep it taut.

The stopping means, Figs. 9 to 18, inclusive, operates to stop the car at an exact point without any calculating on the part of the attendant, as he has merely to throw the lever outward, as in Fig. 9, or draw it inward, as in Figs. 15, 16, and 17. The line is positively engaged by the latch or dog, so that there is no chance for any slipping, as the latch either engages a link in the chain or else a rack-plate mounted on the line, which, however, is shown also as being a chain. In this construction which I have just described the latch or dog ($n'$ in Fig. 9 and $v'$ in the other figures) also constitutes means in the hatchway for engaging the line to prevent creeping, and coacts with the door to lock the line when the door is partially or entirely open, since the door is provided with means (as pin $o'$ and arm $p'$, Fig. 9, or crank-pin $l^2$ and toggle-levers $k^2 k^3$, in Fig. 15) coacting with the latch only when the door is open, since at all other times the latch is held from engagement with the line. The line is hereinafter referred to as being provided with stops, and it will be understood that I do not limit myself to the use of a line having a portion formed as a chain, a rack-bar connected with the line, or a chain connected to the line through the medium of a gear-wheel, as the line may be provided with balls or attachments, which I have not illustrated, since they are common in the art. The line provided with stops is connected with the line-shifting means or pulley $b$ and travels with the car, so that the engagement of the latch therewith prevents creeping.

When I refer to the "means mounted on the car independently of the shifting means for connecting the line and the latch" I mean that the tooth $f'$ in Fig. 9, and the cross-head $x'$ and chain $s'$ in Fig. 15, and the cross-head $x'$ in Fig. 18 are not supported upon the line-shifting pulley $b$, but are mounted independently thereof on the wall of the car, although the said tooth in Fig. 9 and the said chain and cross-head in Figs. 15 and 16 and said cross-head in Fig. 18 are all indirectly connected therewith. In all these cases the engagement of the latch with the tooth or the chain, the chain $e$ being a part of the line itself in Fig. 18, shifts the line to stop the travel of the car, the positive engagement being caused by a hand device consisting of lever $l'$, crank $k'$, and link $j'$ in the embodiment of the invention illustrated in Fig. 9, and handle $b^2$, rod $a^2$, lever $i^2$, link $h^2$, and bell-crank lever $g^2$ for operating the crosshead $x'$ in those forms illustrated in Figs. 15, 16, and 18.

In Figs. 21 to 33, inclusive, I have illustrated several forms of mechanism for automatically closing and locking the corridor-door so as to prevent any one from incautiously leaving the door open or unlatched and thereby causing an accident. It is always necessary in a building to have one of the corridor-doors (usually the one in the basement) provided with means whereby it may be operated from the outside, so that the attendant may have ingress to the elevator-car, and also necessary to have the other corridor-doors provided with locks that can be operated only from the inside, and in order to prevent a door from being left unlatched by a careless attendant it is desirable that means may be provided for causing the door to close automatically after it is started by the attendant.

I provide toggle-levers $a^3$ $b^3$, pivoted together, the lever $a^3$ having its forward end pivoted to a bracket $c^3$ at the rear edge of the door and the lever $b^3$ having its rear edge pivoted to a bracket $d^3$, secured to the wall. The levers are of such length that when the door is closed they are on a "dead-center," one of the levers $b^3$ being provided with a stop $e^3$, adapted to project laterally and lie upon the top of lever $a^3$ to hold them in this position.

$f^3$ is a weight depending from the pivot connection of the two levers and of a size sufficient to slide the door forward when the levers are moved, so as to form an angle or an inverted V. The bracket is extended a short distance out beyond the wall, so that when the door is moved to its extreme open position the pivot connecting the levers lies on the opposite side of the pivot in the bracket $d^3$, so as to support the weight in its raised position. A slight forward movement of the door, however, will throw the weight past the pivot and the door will automatically shut. When the door has been shut, the levers will positively lock the door against opening.

In order to provide means for throwing the levers out of their dead-center position, several devices may be employed.

Figures 21, 22:
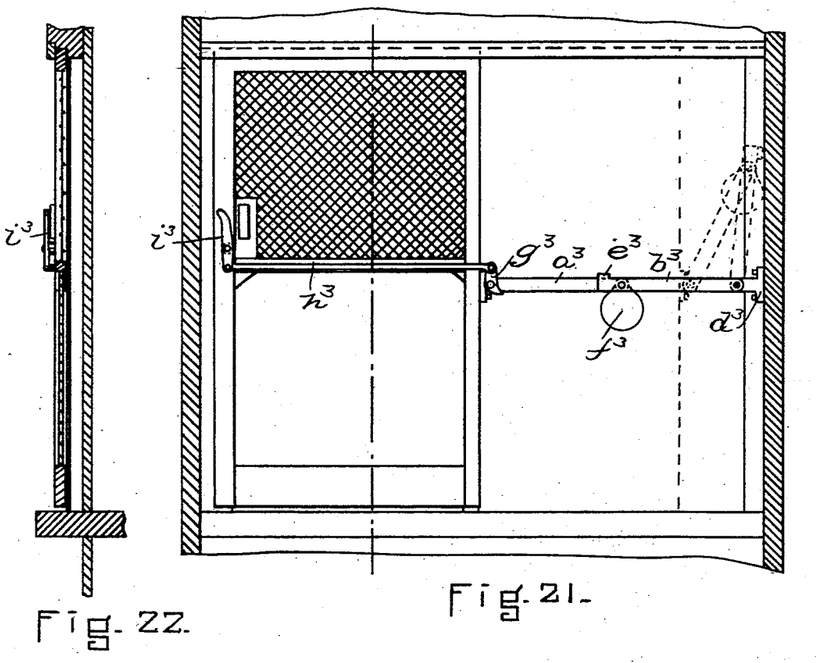
Figs. 21 to 23, inclusive, show an improved means for positively locking the corridor-door against movement from the outside by aid of weighted toggle-levers.
Figure 23:
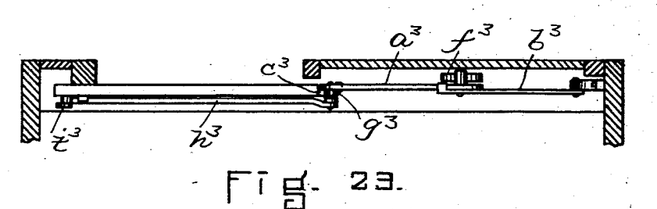

In Fig. 21 I have shown how a lever $g^3$, with a laterally-projecting end lying under the lever $a^3$, may be pivoted on the bracket $c^3$ and connected by a link $h^3$ with a handle $i^3$, pivoted at the front of the door. When the handle is pulled backward by the attendant, the lever $g^3$ is tilted, lifting the lever $a^3$ so as to throw the central pivot out of alinement with the two other pivots, whereby the door may be easily slid to open position, where it will remain until it is drawn slightly toward its closed position.

Figures 24, 25:
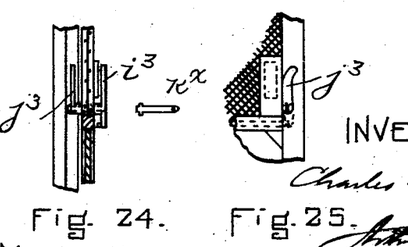
Figs. 24 and 25 show devices for locking the outer handle of the door to the inner handle, whereby the door may be opened from the outside with the aid of a key.

In Figs. 24 and 25 I have shown the handles employed on the corridor-door in the basement. The other doors are not provided with outside handles, as it is desired that they should be opened only from the inside. It is desired to provide the corridor-door of the basement with an outer handle, which may be connected with the inner handle by a key. The outer handle $j^3$ is mounted loosely relatively to the inner handle $i^3$, each being provided with a keyhole-slot, through which a key $k^\times$ may be thrust to connect the handles together. When the key is in place, the turning of the handle $j^3$ will throw the handle $i^3$ to one side and lift the levers from their locked position, so that the door may be opened. It will be understood that the keyhole-slots may be formed in such way as to require a particular key which is in the possession of the janitor or attendant.

Figure 26:
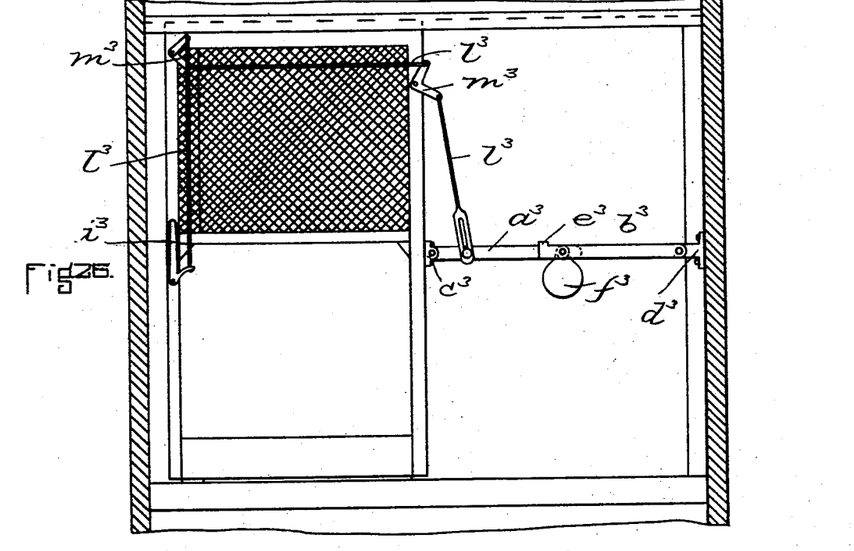
Figs. 26 to 33, inclusive, show door-closing devices, all more or less modified from that shown in Fig. 21.
Figure 27:
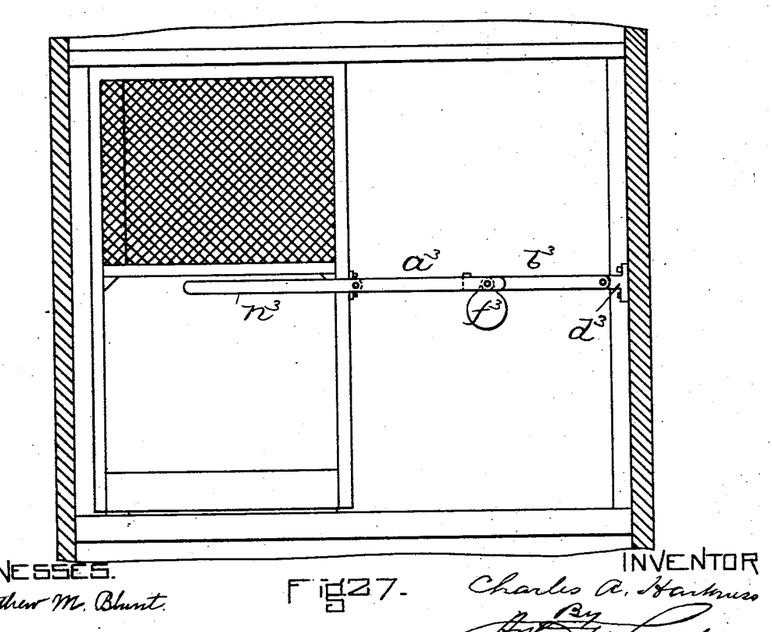
Figure 28:
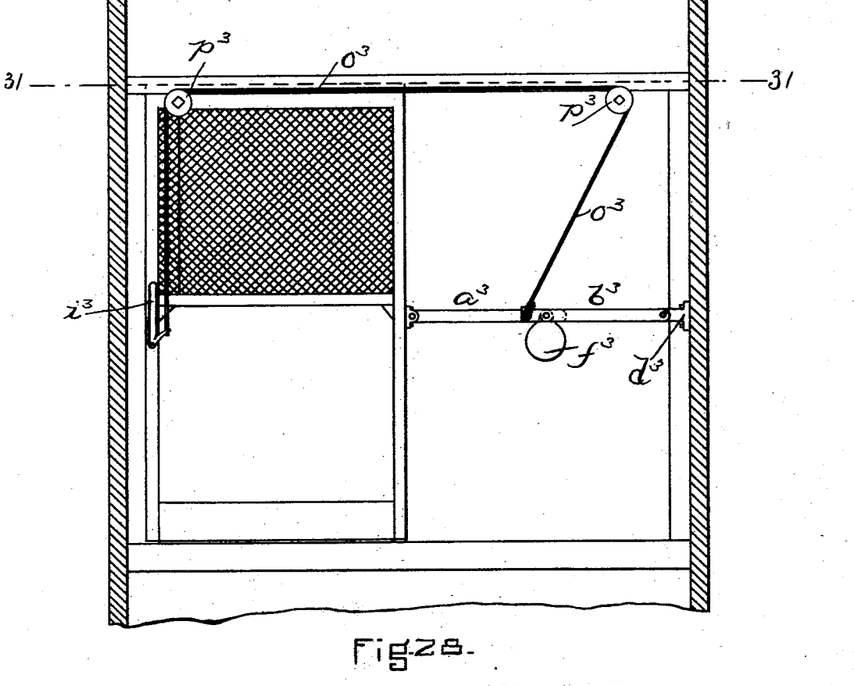
Figures 29, 30:
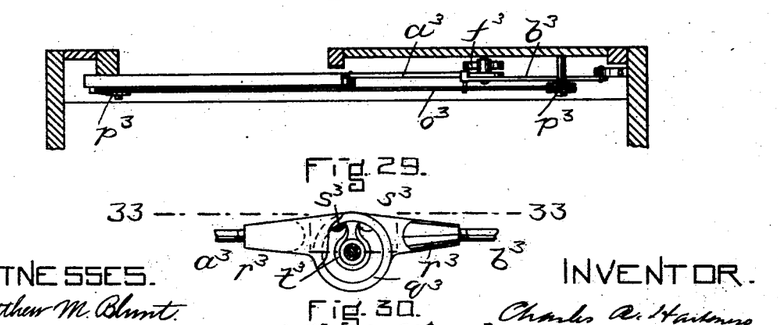
Figure 31:
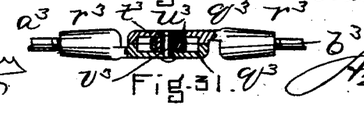

In Fig. 26 the handle $i^3$ is connected with the lever $a^3$ by means of links $l^3$ and levers $m^3$, while in Fig. 27 the lever $a^3$ is extended to form a handle $n^3$, which may be grasped by the attendant and thrust down to open the door. The lever $b^3$ may be connected with the handle, if desired, as illustrated in Figs. 28 and 29, the connecting means in this case consisting of a chain, a cord, rope, or wire $o^3$, passing over idler-pulleys $p^3$.

In Figs. 30 to 33, inclusive, I have shown the levers $a^3$ $b^3$ as being round rods connected together by heavy castings which themselves form the weight to move the door. The metallic castings are duplicates, each being formed with a cup-shaped disk $q^3$ and an internally-threaded socket $r^3$ to receive the end of its rod $a^3$ or $b^3$. The disks are cast with stops or lugs $s^3$ $s^3$, between which a heavy curved spring $t^3$ is inserted to prevent the stops from striking together when the door is closed and to cushion them. One of the disks is cast with a reduced internal annular ring $u^3$, through which a pivot-bolt $v^3$ passes to pivot the castings together. Thus it will be seen that the door is provided with a cushioning spring, and that the rods are provided with weighted means at their pivotal connection without adding a separate independent weight. The means for throwing the rods out of a dead-center consists, in Fig. 32, of a foot-actuated pin $w^3$, a lever $x^3$, connected therewith, and a rod or bar $y^3$, having its upper end under the rod $a^3$. When the pin $w^3$ is depressed by the foot, the rod $y^3$ is raised, lifting up the rod $a^3$, as will be clearly understood.

In all these devices it will be understood that I have provided means for positively locking the door shut without the aid of any projecting catches or hooks, which are always in the way of passengers entering or leaving the car, and which frequently tear the clothing or injure the person. It is impossible to tamper with a lock of this character or to leave the door partially open.

Figures 32, 33, 34:
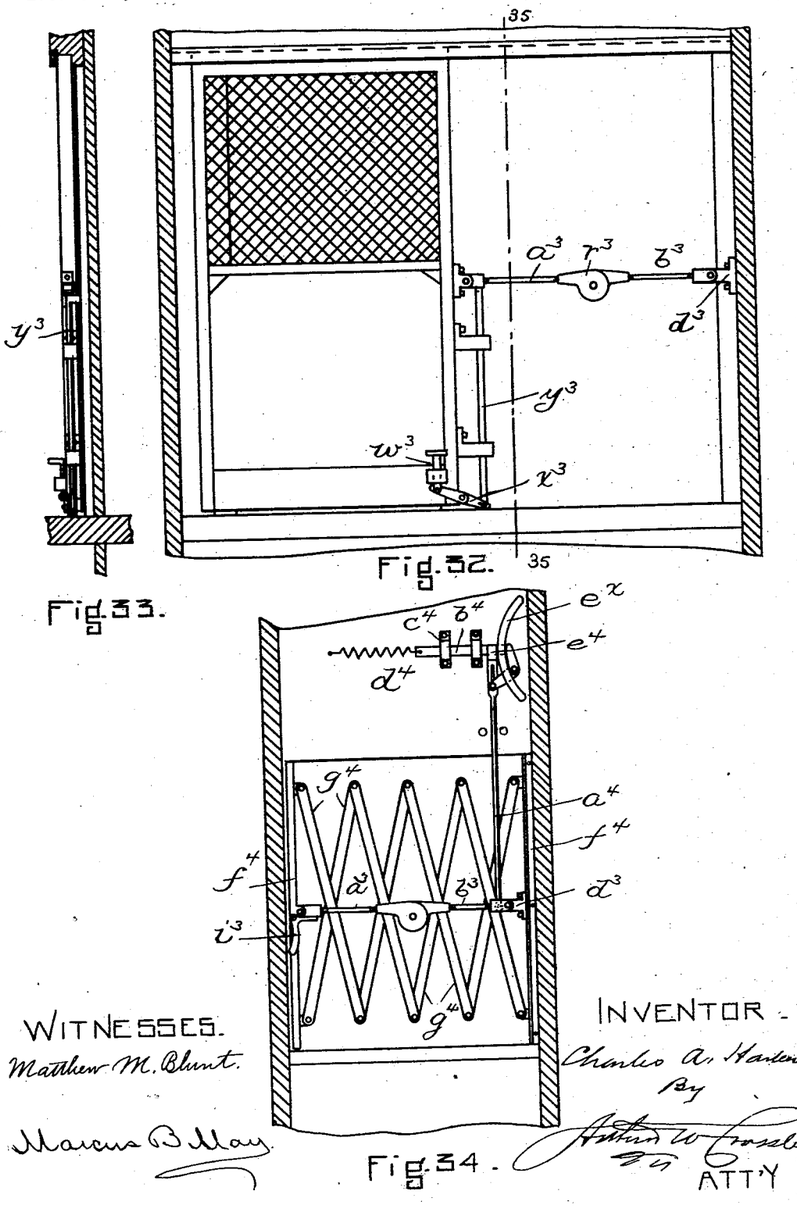
Fig. 34 illustrates a secondary lock for the door which is quite frequently employed in connection with the toggle-levers and which is adapted to be operated by the car or a device mounted thereon.

In order to prevent the door from being opened except when the car is opposite it, I provide a secondary lock, one form of which is shown in Fig. 34. The form illustrated in the last-mentioned figure consists of a vertical rod $a^4$, pivoted to the lever $b^3$, and a horizontally-sliding bar $b^4$, supported in guides $c^4$ and normally held by a retractile spring $d^4$, so that a lateral projection $e^4$ on said bar $b^4$ will lie just above the end of the said rod $a^4$. The bar $b^4$ is provided at its outer end with a curved cross head or bow $e^\times$, with which a projection (not shown) on the car may engage and draw the bar forward, so as to remove the projection $e^4$ from above the rod, so that the latter is free to rise when the levers $a^3$ $b^3$ are actuated. In order to insure that the end of the rod $a^4$ shall escape the projection on the bar $b^4$ when the cross-head is moved forward by the projection on the car, I connect the slotted upper end of the said rod $a^4$ with one arm of a bell-lever $r^5$, the other arm of which rests against the end of the bar $b^4$, so that when the said bar is moved forward the bell-lever will throw the upper end of the bar $a^4$ to one side, so that as it rises it will escape the lateral projection $e^4$ on the bar $b^4$. In this way I provide not only a lock for preventing mischievously-inclined or forgetful persons from opening the door or leaving it open, but provide, in addition thereto, means for positively preventing the door from being opened except when the car is opposite it.

The locking-levers may be employed in connection with the extensible doors sometimes employed in elevators, as shown in said Fig. 34, in which two vertical side bars $f^4$ $f^4$ are connected by lazy tongs $g^4$ $g^4$, so that the said bars may be moved toward each other to open the passage-way, or from each other to close it. The weighted toggle-levers are pivoted to the side bars $f^4$ $f^4$ so as to hold them in a separated position, and the secondary lock, as shown in Fig. 34, is employed to prevent the levers from being operated except when the car is opposite the door, as the said secondary lock is mounted in such way as to be inaccessible to mischievous or evil-minded persons.

Having thus explained the nature of the invention and described ways of constructing and using the same, though without attempting to set forth all of the forms in which it may be made or all of the modes of its use, it is declared that what is claimed is—

1. In an elevator, a car, a pulley thereon, a hand device for said pulley, two actuating-pulleys connected with the motor, guides on the wall of the hatchway out of the path of the car, a tension device traveling in said guides and having a pulley, and a controlling-line having its ends secured directly to the wall of the hatchway, and passing under the pulley of the tension device, around the said actuating-pulleys, and around the said pulley on the car.

2. In an elevator, a car, a hand device on the car for the controlling-line, two actuating-pulleys connected with the motor, stationary guides out of the path of the car, a tension device traveling in said guides and having a pulley, an idler-pulley on the walls of the hatchway, and a controlling-line having its ends secured directly to the wall of the hatchway and passing under the pulley on the tension device, around the idler-pulley on the wall of the hatchway, from thence around the actuating-pulleys, and finally connected to the hand device on the car.

3. An elevator apparatus, comprising a car, a line traveling with the car, a hand device on the car for shifting said line, a movable door, and means coacting with the door for locking the line when the door is partially or entirely open.

4. In an elevator, a movable door, a controlling-line connected to and traveling with the car, and means coacting with the door to lock said line against movement relatively to the hatchway while the door is partially or entirely open, whereby creeping of the car is prevented.

5. In an elevator, a car, an operative line traveling with the car, and means in the hatchway for locking said line to the hatchway to prevent creeping of the car.

6. In an elevator, a car, an operative line traveling with the car, a movable door, a latch for said line mounted in the hatchway, and means mounted on said door and coacting with said latch whereby the latch locks the line to the hatchway when the door is partially or entirely open.

7. An elevator-controlling device, comprising a line traveling with the car, a movable latch mounted in the hatchway, a movable door, and means coacting with the door whereby the latch is engaged with the line only when the door is open.

8. An elevator-controlling device, comprising a line traveling with the car and provided with stops, a movable latch mounted in the hatchway, a door, and means coacting with the door for holding the latch out of engagement with the line except when the door is open.

9. An elevator-controlling device, comprising shifting means on the car, a chain connected therewith and traveling with the car, a movable latch in the hatchway, and a door, coacting with said latch whereby the latch is moved into engagement with the chain when the door is open.

10. An elevator-controlling device comprising an operative line traveling with the car, a supplemental chain mounted on the car and connected with the line-shifting means, a movable latch in the hatchway, and a door coacting with said latch whereby the latter is engaged with the links of the supplemental chain only when the door is open.

11. An elevator-controlling device, comprising a line traveling with the car for controlling the motor, means on the car for shifting the said line, a movable latch in the hatchway, and means mounted on the car independently of the said shifting means for connecting the line and the latch to stop the car.

12. An elevator-controlling device comprising a line traveling with the car for controlling the motor, means on the car for shifting the line, a movable latch in the hatchway, means with which the latch may engage, said means being operatively connected with the line and mounted on the car independently of the said shifting means, and a hand device for causing said latch to engage the last said means and thereby stop the travel of the car.

13. An elevator-controlling device comprising line-shifting means on the car, a line traveling with the car and provided with one or more stops, said line being connected with the said line-shifting means, a latch on the wall of the hatchway and means on the car for causing a positive engagement between said latch and the said line provided with stops as aforesaid, to stop the travel of the car.

14. An elevator-controlling device comprising line-shifting means on the car, a line traveling with the car provided with one or more stops, and connected with the line-shifting means, a latch on the wall of the hatchway, and hand-operative means on the car for causing a positive engagement between the said latch and the said line, to stop the travel of the car.

15. An elevator-controlling device, comprising shifting means on the car, a chain connected therewith and traveling with the car, a movable latch in the hatchway, and hand-operative means on the car for moving said latch into engagement with the said chain.

16. An elevator-controlling device comprising shifting means on the car, a chain traveling with the car and connected with the shifting means, a movable latch mounted in the hatchway, and a hand-operative means, having as a part thereof a bow or cross-head for moving the latch into engagement with the chain.

17. An elevator-controlling device, comprising an operative line, means on the car for shifting the line to operate the car, secondary mechanism for stopping the car, and a single handle adapted to be connected to both said line-shifting means and said secondary mechanism whereby either may be operated thereby.

18. An elevator-controlling device, comprising a controlling-line, a wheel or pulley on the car for shifting the line, a secondary mechanism for stopping the car, and a handle arranged to operate either the wheel or pulley or the stopping mechanism alternately, and in such way that when one is being operated the other is disengaged therefrom.

19. An elevator-controlling device, comprising an operative line, a latch for engaging the line, a wheel on the car for operating the line, a handle for the wheel and means for disengaging the handle and the wheel when the latch engages the line.

20. An elevator-controlling device, comprising an operative line, a latch in the hatchway for engaging said line, a wheel on the car for the operative line, a handle, and a clutch interposed between the handle and the wheel, whereby when the wheel is turned during the travel of the car by the engagement of the latch with the line, the handle is not turned but remains stationary.

21. An elevator-controlling apparatus, comprising an operative line, a latch, a wheel on the car for operating said line, means on the car for causing the latch to engage the line, and a handle connected to the said wheel and to the said means, for operating both of them.

22. An elevator-controlling device, comprising an operative line, a latch for engaging said line, a wheel on the car for operating the line, means on the car for causing the latch to engage the line, a handle connected with the said means, and a clutch interposed between the handle and the wheel.

23. As a means for locking the controlling-line of an elevator, a movable door having an arm secured thereto, and a pivoted weighted latch directly engaged by the arm on the door, whereby it is held out of its locking position, and being adapted to swing to its locking position when the door is partially or entirely open.

24. As a means for locking the controlling-line of an elevator, a movable door provided with an arm which moves therewith, a weighted latch pivoted to normally swing into its locking position, but engaged by the arm of the door and held out of its locking position by the said arm when the door is closed, said arm moving as aforesaid with the door, whereby the latch swings into its locking position when the door is partly or entirely open.

25. An elevator-controlling device comprising an operative line, a latch for engaging said line, a wheel on the car for operating the line, a tubular shaft for said wheel, means on the car for causing the latch to engage the line, a rod passing through the tubular shaft for operating said means, a handle pivoted to a collar loose on the shaft, and having the said rod secured thereto, and a clutch interposed between the handle and the tubular shaft.

26. A lock for a door, consisting of toggle-levers pivoted to the door and to a stationary support and arranged to have their pivots in a straight line when the door is closed, and a stop carried by one of the levers for engaging the other lever for the purpose set forth.

27. A lock for a door, consisting of two pivoted levers, one having its outer end pivoted to the rear edge of the door, and the other having its outer end pivoted to the wall in the rear of the door, whereby said levers are out of the way behind the door when the latter is opened, and a stop carried by one lever for engaging the other lever to hold them with their pivots in a straight line.

28. A lock for a door, consisting of toggle-levers pivoted to the door and to a stationary support, and arranged to have their pivots in a straight line when the door is closed, a handle pivoted on the door, a lever for moving the toggle-levers so that the door may be opened, and a link connecting the handle on the door and the said lever.

29. A lock for a door, consisting of toggle-levers pivoted to the door and to a stationary support, and arranged to have their pivots in a straight line when the door is closed, a handle pivoted on the door, a lever arranged to have a portion under one of the toggle-levers to lift it, and a link connecting the handle and the said lever.

30. The combination with the door and the toggle-levers pivoted together, of stops on the adjacent ends of said levers, and a spring interposed between said stops.

31. The combination with a movable door, and two toggle-levers for locking said door, and pivoted to the door and to a stationary support, a vertically-movable bar connected with one of said levers, and a lock for said bar adapted to be moved out of the path of the said bar by the car, so as to allow the door to be opened.

32. The combination with a door, and a lock for said door, of a mechanism for locking the said lock from being actuated, and having a portion extending out into the path of the car, whereby it may be positively engaged by said car, and mechanically disengaged by the car from the said lock.

33. The combination with a door, and a lock for said door, of mechanism for locking the said lock from being actuated, said mechanism having as a part thereof a cross-head mechanically connected to said lock mechanism adapted to be directly and positively engaged by the car, for mechanically disengaging the mechanism from the lock.

In testimony whereof I have signed my name to this specification, in the presence of two subscribing witnesses, this 20th day of November, A. D. 1894.

CHARLES A. HARKNESS.

Witnesses:
ARTHUR W. CROSSLEY,
MARCUS B. MAY.